April 5, 1966
W. B. REED ETAL
3,244,434
SELECTIVELY OR SPEED RESPONSIVELY POSITIONED
TOWING-EYE DEVICE FOR VEHICLES
Filed April 30, 1962
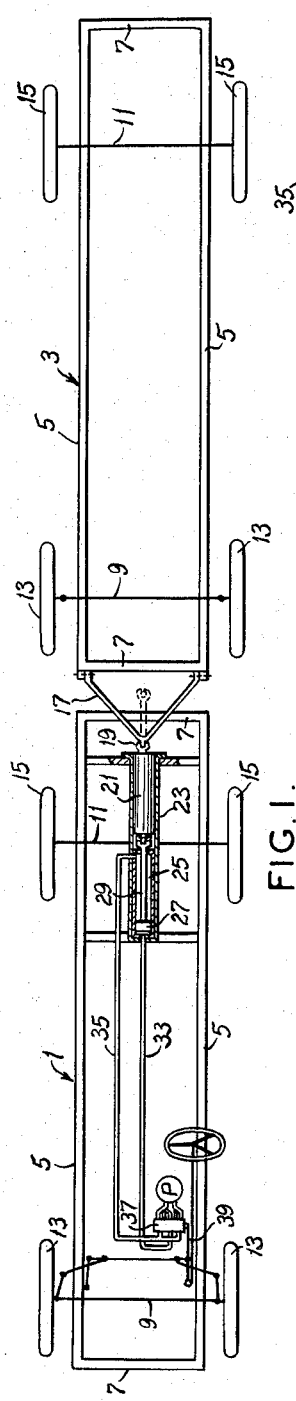
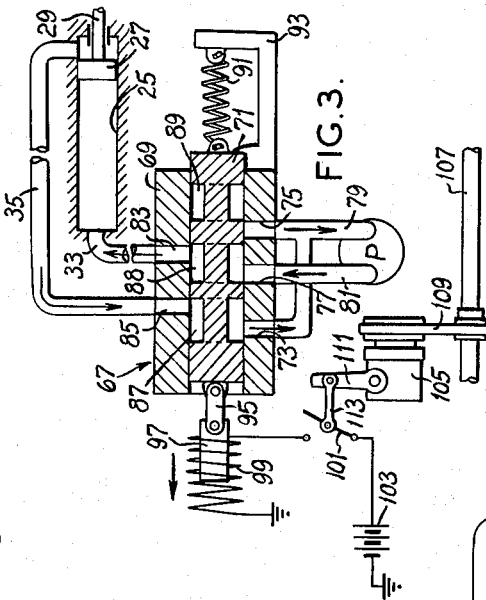
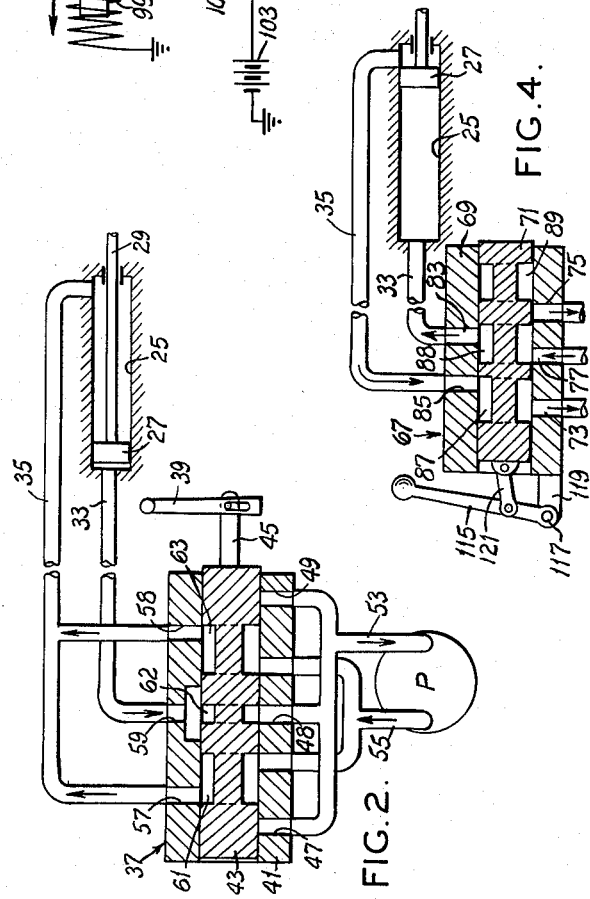
INVENTORS,
WINTHROP B. REED,
LLOYD J. WOLF.
BY Bedell & Burgess
ATTORNEYS.

United States Patent Office 3,244,434
Patented Apr. 5, 1966

3,244,434
SELECTIVELY OR SPEED RESPONSIVELY POSITIONED TOWING-EYE DEVICE FOR VEHICLES
Winthrop B. Reed, St. Louis, Mo., and Lloyd J. Wolf, Dallas, Tex., assignors to General Steel Industries, Inc., Granite City, Ill., a corporation of Delaware
Filed Apr. 30, 1962, Ser. No. 190,908
18 Claims. (Cl. 280—446)

The invention relates to land vehicles and consists particularly in means for varying the distance of the towing attachment point for towed vehicles from the rear axle of the towing vehicle during operation of the vehicle whereby to position the towing attachment point relatively remote from the rear axle during low speed city operation where short radius turns must be made and relatively close to the rear axle for high-speed over-the-road operation.

Turning radius of the towed vehicle is dependent upon two dimensions—distance of the towing attachment point from the center line of the rear axle of the towing vehicle, and the distance of the towing attachment point from the center line of the steering axle of the towed vehicle. As the first named dimension increases, the towed vehicle tracks more closely with the towing vehicle when cornering, but for high-speed over-the-road operation, where short radius turning is not required, towing stability increases as the first-named dimension decreases.

It accordingly is a main object of the invention to improve tracking of a towed vehicle when cornering and to improve towing stability during high-speed over-the-road operation.

It is a further object to effectuate the main object by providing means for varying the distance of the towing attachment point from the rear axle of the towing vehicle, during operation of the vehicle.

It is a further object to provide steering-responsive means for varying the distance of the towing attachment point from the center line of the rear axle of the towing vehicle while the vehicle is operating.

It is an additional object to provide vehicle speed-responsive means for varying the distance of the towing attachment point from the rear axle of the towing vehicle while the vehicle is operating.

It is an additional object to provide manually-controlled means for varying the distance of the towing attachment point from the rear axle of the towing vehicle while the vehicle is operating.

It is a further object to make the towing attachment point of a vehicle movable from a position under the body thereof and relatively close to the vehicle rear axle to a point rearwardly clear of the body to facilitate coupling of a trailing vehicle to the first vehicle.

The foregoing and additional objects and advantages of the invention will be apparent from the following description and the accompanying drawings in which:

FIG. 1 is a plan view of coupled vehicles embodying one form of the invention.

FIG. 2 is a detail view of the control system used in the embodiment of the invention illustrated in FIG. 1.

FIG. 3 is a detailed view of a modified control system.

FIG. 4 is a detailed view of another modified control system.

Referring now to FIGS. 1 and 2, the numerals 1 and 3 refer generally, respectively, to the body-supporting frames of a pair of highway vehicles in longitudinally aligned relation with each other, each chassis comprising longitudinally extending side members 5 and suitable transverse members 7. Frames 1 and 3 are supported in conventional fashion on front axles 9 and rear axles 11, which in turn mount, respectively, steerable front wheels 13 and nonsteerable rear wheels 15.

Rear frame 3 mounts, on its forward end a V-shaped tow-bar 17, which is pivotally attached at its apex to a towing attachment structure comprising a towing eye 19 carried by the forward frame.

To provide for translation of the towing eye 19 lengthwise of frame 1, so that it can be selectively or automatically positioned, as shown, well forward of the rear end of frame 1 and relatively close to the rear axle for operation of the coupled vehicles over the road at high speeds where short radius turns would not be required, or be positioned in the broken line location, rearwardly of the rear end of frame 1, for operation through short radius turns, towing eye 19 is secured to the rear end of elongated guide piston 21, which is slidably mounted in a cylinder 23 secured to frame 1 on its longitudinal center line and symmetrically disposed relative to rear axle 11. The forward portion of cylinder 23 rigidly mounts a hydraulic cylinder 25, in which is slidably mounted hydraulic piston 27. Hydraulic piston 27 is connected, by means of a piston rod 29, to guide piston 21, so that movement of the former will control the position of the latter and of towing eye 19.

For positioning piston 27, hydraulic cylinder 25 is connected, at its opposite ends, by conduits 33 and 35 respectively, to a valve 37 actuated by steering gear arm 39, so that whenever the steering gear is displaced a predetermined amount in either direction from its illustrated centered position, piston 27 will be urged rearwardly.

Valve 37, as best seen in FIG. 2, is of the spool type, and consists of centrally apertured housing 41 and cylindrical spool 43 slidably mounted within housing 41. Spool 43 is connected by an extension 45 to steering gear arm 39, so that movement of the steering gear arm a predetermined distance in either direction from its centered position will cause a corresponding translation of spool 43 in the valve housing. One side of housing 41 is provided with three equally spaced apart outlet ports 47, 48 and 49 and a pair of inlet ports 51 and 52 which are positioned, respectively, between outlet ports 47 and 48, and 48 and 49. The outlet ports are connected by a suitable conduit 53 to the input side of hydraulic pump P, and the inlet ports are similarly connected, by means of conduit 55 to the output side of hydraulic pump P.

The opposite side of housing 41 is provided with a pair of spaced apart ports 57 and 58 in communication with conduit 35, and an intermediate port 59 in communication with conduit 33. Ports 57 and 58 are positioned, respectively, between, but disaligned from pump ports 47 and 51, and 52 and 49, and port 59 is aligned with central output port 47 and is substantially wider lengthwise of the housing than the opposite outlet port 48. Spool 43 is formed with three annular grooves 61, 62 and 63, which are in the positions illustrated, when the steering gear arm 39 is centered; i.e., grooves 61 and 63 are in registry respectively with inlet ports 51 and 52 and ports 57 and 58, thus permitting fluid under pressure to pass from pump P and via conduit 35, to the rear side of piston 27, thus urging it and towing eye 19 forwardly. At the same time groove 62 is in registry with port 59 and central outlet port 48, thus permitting the return to the pump, via conduit 33, of fluid from the rear side of piston 27. When steering gear arm 39 moves a predetermined distance, preferably sufficient to produce a steering deflection of approximately 25°, in either direction from its illustrated centered position, the valve reverses the connections of the conduits 33 and 35 to the pump input and output, so that conduit 33 is connected to the output, thus causing rearward movement of piston 27, and conduit 35 is connected to the pump input, to permit the return to the pump of fluid in cylinder 23 rearward of the piston. For example, if steering gear arm 39 moves toward the left, spool 43 will move toward the left until groove 61 registers with ports 47 and 57, thus connecting the pump input to conduit 35, and groove 63 registers with ports 52 and 59, thus connecting the pump output to conduit 33. If the steering gear arm moves to the right, groove 61 will register with ports 31 and 59, thus similarly connecting the pump output to conduit 33, and groove 63 will register with ports 49 and 53, thus similarly connecting the pump input to conduit 35.

Operation of this form of the invention is as follows: During operation of the coupled vehicles along a substantially straight or gently curving course, as along a typical intercity highway, the steering gear would be either centered as shown in FIG. 1 or only slightly off center, and valve 37 would be positioned as shown in FIG. 2, causing the application of hydraulic pressure to the rear surface of piston 27, and the resultant positioning of the towing eye in its illustrated position well forward of the rear end of the towing vehicle frame. With the towing eye in this position, so that its distance from towing vehicle rear axle 11 is relatively short, a high degree of towing stability will be provided for high-speed over-the-road operation. When a short radius turn is made, as in turning a corner from one city street into another, steering gear arm 39 causes translation of spool 43 of valve 37, reversing the hydraulic connections so that hydraulic pressure is applied to the forward face of piston 27, causing it to move rearwardly to a position clear of the vehicle frame, as shown in broken lines in FIG. 1. With the towing eye in this position, so that its distance from the rear axle 11 of the towing vehicle is substantially greater than the distance of the forward axle of the towed vehicle, from the towing eye, in the order of 1.5:1, and the towed vehicle will track closely with the towing vehicle when making sharp turns.

In the second form of the invention, illustrated in FIG. 3, a speed responsive control is provided for positioning the towing eye whereby during high-speed over-the-road operation the towing eye will be maintained in the retracted position shown in FIG. 1, and when speed is reduced to take sharp turns, the towing eye will be moved rearwardly to the broken line position of FIG. 1. This embodiment utilizes a spool valve 67 to control the flow of hydraulic fluid from pump P to cylinder 25. Valve 67 consists of a tubular body 69 and a cylindrical spool 71 slidably mounted therein. Body 69 is formed in one side with a pair of outlet ports 73 and 75 spaced apart lengthwise of the body, and a single inlet port 77 substantially intermediate the outlet ports. Outlet ports are connected by conduit 79 with the input of hydraulic pump P, and inlet ports are connected by conduit 81 with the output of pump P. The opposite side of valve body 69 is formed with a pair of ports 83 and 85, communicating, respectively, with conduits 33 and 35. Spool 71 is formed with three equally spaced apart annular grooves 87, 88 and 89 arranged to provide, alternatively, communication between inlet port 77 and port 83 and between outlet port 75 and port 85, as illustrated in FIG. 3, or between inlet port 77 and port 85, and between outlet port 75 and port 83. With the spool in the former position, the output side of pump P forces fluid through the valve and conduit 33 against the forward side of the piston, causing the piston and towing eye to be positioned in their rearmost position, as shown in broken lines in FIG. 1. During operation below a predetermined speed, spool 71 is biased in this position by spring 91, which is attached at one end to spool 71 and at the other end to a bracket 93 mounted on the valve body. For moving the spool to the second position described above for high-speed over-the-road operation when the predetermined speed referred to above is exceeded, the spool is connected by link 95 to armature 97 of a solenoid, the coil 99 of which is connected, through normally open switch 101 to a source of electric current. For controlling switch 101, governor 105, connected to the vehicle propeller shaft 107 by belt 109, is provided, its arm 111 being connected by link 113 to switch 101 whereby to close switch 101 when the vehicle speed exceeds the above mentioned predetermined value, which may be between 15 and 20 m.p.h. Upon closure of switch 101, solenoid coil 99 is energized, drawing spool 71 to the left until pump output conduit 81 is in communication with conduit 35, bringing liquid under pressure against the rear face of piston 27, and conduit 33 is in communication with pump input conduit 75, permitting the return to the pump of fluid forward of piston 27. Thus, when this occurs, piston 27 will move towing eye 19 to the forward position shown in solid lines in FIG. 1.

Operation of the form of the invention shown in FIG. 3 is as follows: During city operation at relatively low speeds, where frequent cornering may be required, switch 101 is open and valve spool 71 is in the spring-biased position illustrated to pass fluid under pressure from pump P, through conduit 33 to the forward face of piston 27 and the spent fluid from the rear face of the piston to the pump, thus maintaining the piston in its rearmost position and the towing eye in the broken line position of FIG. 1. With the towing eye in this position tracking of the trailing vehicle on sharp turns is facilitated, as described above. When the vehicle speed is increased, as for over-the-road intercity operation, governor arm 111 moves to the left, closing switch 101 and energizing solenoid coil 99, thus shifting spool 71 until groove 88 connects pump output conduit 81 with conduit 35 and pump intake conduit 79 with conduit 33, whereby piston 27 and with it towing eye 19 are moved forwardly to the high speed position shown in solid line in FIG. 1. With the towing eye in this position excellent towing stability will be maintained during relatively straight high-speed operation.

A third form of the invention, providing manual control of the towing eye position, is illustrated in FIG. 4. In this embodiment, the valve 67 is the same as in the last previously described embodiment, but the speed-responsive solenoid control is replaced by a manual control comprising lever 115 fulcrumed at 117 on a bracket 119 carried by valve body 69. Lever 115 is connected, by means of link 121 to spool 71 so that the vehicle operator can selectively shift the spool between its two positions in accordance with operating conditions including the speed of operation or the angularity of turns.

Operation of the last-described form of the device is as follows: During operation along city streets, the vehicle operator would be able to keep the valve spool in the position illustrated, causing piston 27 to remain in its rearmost position, with towing eye 19 fully extended to the broken line position of FIG. 1. When leaving city streets and starting across country, the operator would be able to shift the spool to the other position whereby the towing eye would move to the forward position shown in solid lines in FIG. 1. To facilitate coupling and uncoupling operations at any time, the operator could position the valve spool as shown in FIG. 4 whereby to cause rearward extension of the towing eye to the easily accessible broken line position of FIG. 1.

It will be understood that the details of the disclosed arrangements may be varied without departing from the spirit of the invention and that the exclusive use of those modifications as come within the scope of the appended claims is contemplated.

What is claimed is:

1. In a land vehicle having spaced apart front and rear axles and a body-supporting frame carried thereon, means mounted on the vehicle for movement lengthwise thereof and for pivotal connection to a tow bar of a trailing vehicle having spaced front and rear axles, and power means operable during motion of the vehicle to effect such lengthwise movement of said connection means, said connection means being movable from a point forward of the rear end of said frame to a point rearward of the rear end of said frame.

2. In a land vehicle according to claim 1, said power means being manually controllable.

3. In a land vehicle according to claim 1, said power means being responsive to vehicle speed.

4. In a land vehicle according to claim 1, said power means being responsive to vehicle steering.

5. In a land vehicle having spaced apart front and rear axles and a body supporting frame supported by said axles and extending rearwardly from said rear axle, means for pivotal connection to a tow bar of a trailing vehicle having spaced front and rear axles, said connecting means being mounted on said vehicle frame and movable lengthwise thereof from a position intermediate said rear axle and the vehicle frame rear end to a position rearwardly of the vehicle frame rear end, and power means operable while the vehicle is in motion to effect such lengthwise movement of said pivotal connection means.

6. In a land vehicle according to claim 5, wheels on said axles, means for steering the wheels on said front axle, and means operated by said steering means for positioning said pivotal connection means intermediate said rear axle and the vehicle frame rear end when the steering deflection is less than a predetermined value and rearwardly of the vehicle frame rear end when the steering deflection exceeds such predetermined value.

7. In a land vehicle according to claim 5, wheels on said axles, power means, means drivingly connecting said power means with some of said wheels, and speed-responsive means operated by said connecting means for positioning said towing pivotal connection means intermediate said rear axle and the rear end of said frame when vehicle speed exceeds a predetermined value and rearwardly of the rear end of said vehicle frame when vehicle speed is less than such predetermined value.

8. In a land vehicle according to claim 5, said power means comprising a cylinder mounted on said vehicle with its axis lengthwise thereof, a piston in said cylinder, said pivotal connection means being connected to said piston for movement therewith lengthwise of the vehicle, and means for controlling the admission of fluid to opposite ends of said cylinder during operation of said vehicle.

9. In a land vehicle according to claim 8, wheels on said axles, means for steering the wheels on said front axle, said controlling means comprising means operated by said steering means for admitting fluid to the rear end of said cylinder when steering deflection is less than a predetermined value and for admitting fluid to the forward end of said cylinder when steering deflection exceeds a predetermined value.

10. In a land vehicle according to claim 9, a source of fluid under pressure, said steering means comprising a steering gear having an output arm movable from a normal centered position to provide steering deflection, means connecting said source and said cylinder and including a valve, said valve being connected to said steering gear output arm and having a corresponding normally centered position providing communication between the output of said source and the rear end of said cylinder whereby to position said piston in its forwardmost position and said towing pivotal connection means intermediate said rear axle and the rear end of said vehicle frame when said steering gear output arm is centered and up to predetermined deflections of said steering gear output arm in either direction from the centered position, said valve being movable from its centered position to off-center positions when said predetermined deflection of said steering gear output arm is exceeded, said off-center positions providing communication between the output of said source and the forward end of said cylinder whereby to position said piston in its rearmost position and said pivotal connection means rearwardly of the rear end of said vehicle frame.

11. In a land vehicle according to claim 8, said controlling means comprising a source of fluid under pressure, conduits connecting said source to both ends of said cylinder, and valve means in said conduits for reversing the conduit connections between said source and the opposite ends of said cylinder.

12. In a land vehicle according to claim 8, wheels on said axles, means drivingly connecting said controlling means with some of said wheels, said controlling means comprising speed-responsive means operated by said connecting means for admitting fluid to the rear end of said cylinder when vehicle speed exceeds a predetermined value and to the forward end of the cylinder when vehicle speed is less than such predetermined value.

13. In a land vehicle according to claim 12, a source of fluid under pressure, conduit means connecting said source to opposite ends of said cylinder, said speed-responsive means comprising a governor and said controlling means including a valve in said conduit means, said valve being operable by said governor to reverse the connection between said fluid source and the opposite ends of the cylinder at predetermined vehicle speeds.

14. In a land vehicle according to claim 13, said operative connection between said governor and said valve comprising an electrical circuit including a source of electric current, means for opening and closing said circuit, and a solenoid having an armature directly connected to said valve.

15. A vehicle train comprising a pair of land vehicles each having spaced apart front and rear axles and a body-supporting frame supported by said axles, towing pivotal connection means mounted on the rear end portion of one of said vehicles for shifting lengthwise thereof to selected fixed positions forwardly and rearwardly of the rear end of said one vehicle during operation of the train, and a tow bar secured against longitudinal movement to the front end of said other vehicle and pivotally connected on a vertical axis to said connection means and held against substantial movement pivotally in the horizontal plane, transversely and lengthwise of said other vehicle.

16. A vehicle train according to claim 15 in which there are wheels on said axles, said wheels on the front axles being steerable.

17. A vehicle train according to claim 16 including means responsive to steering of the front wheels of the forward vehicle for positioning said towing pivotal connection means forwardly of the rear end of the leading vehicle when steering deflections are below a predetermined value and rearwardly thereof when steering deflections exceed such predetermined value.

18. A vehicle train according to claim 15 in which said towing pivotal connection means is positioned, responsive to train speed, forwardly of the rear end of the leading vehicle when the train speed exceeds a predetermined value and rearwardly thereof when train speed is less than such predetermined speed.

References Cited by the Examiner

UNITED STATES PATENTS

| 1,585,180 | 5/1926 | Arato | 280—410 |
| 2,317,508 | 4/1943 | Zoder | 280—407 |
| 2,404,925 | 7/1946 | Sauer | 280—407 |
| 2,750,207 | 6/1956 | Greenway | 280—407 |
| 2,807,477 | 9/1957 | Tuso | 280—407 |
| 2,832,610 | 4/1958 | Le Tarte | 280—405 |
| 2,859,050 | 11/1958 | Stonerock et al. | 280—514 X |

FOREIGN PATENTS 726,936  10/1942  Germany.

LEO FRIAGLIA, *Primary Examiner.*

A. HARRY LEVY, BENJAMIN HERSH, *Examiners.*